Nov. 16, 1937. O. N. WISWELL 2,099,324
DEVICE FOR OPENING CANS
Filed Jan. 2, 1935 2 Sheets-Sheet 1
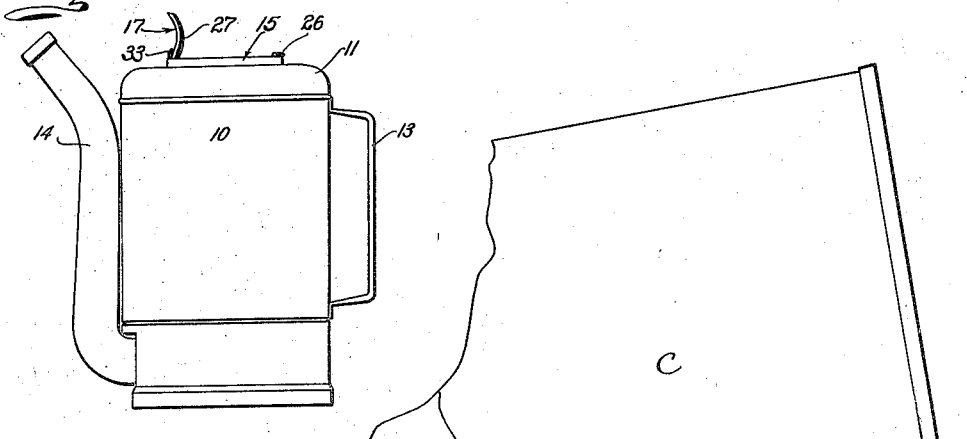
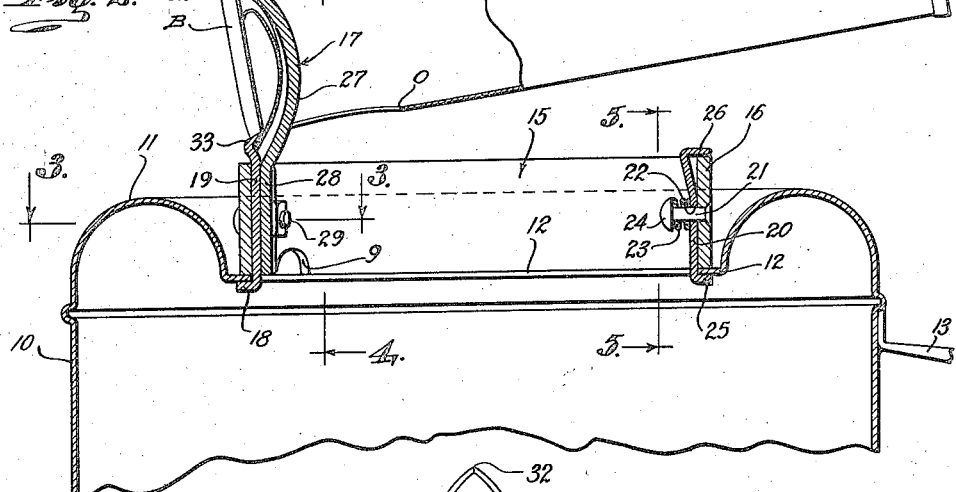
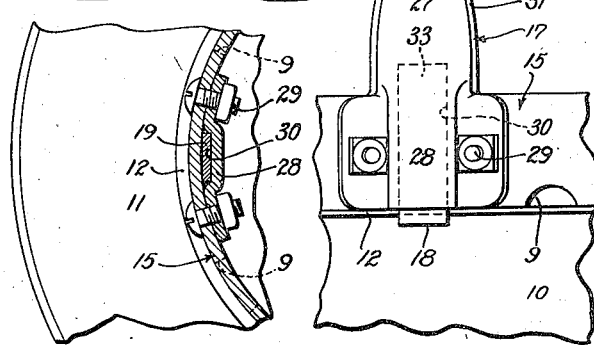
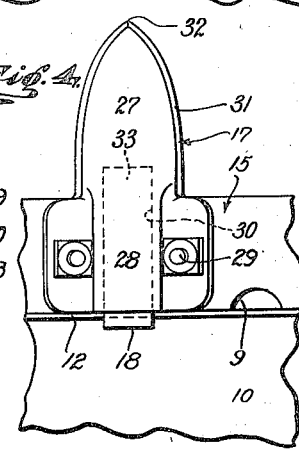
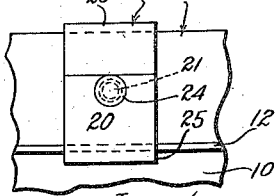
Inventor
OZRO N. WISWELL
By
His Attorney Nov. 16, 1937.   O. N. WISWELL   2,099,324
DEVICE FOR OPENING CANS
Filed Jan. 2, 1935   2 Sheets—Sheet 2
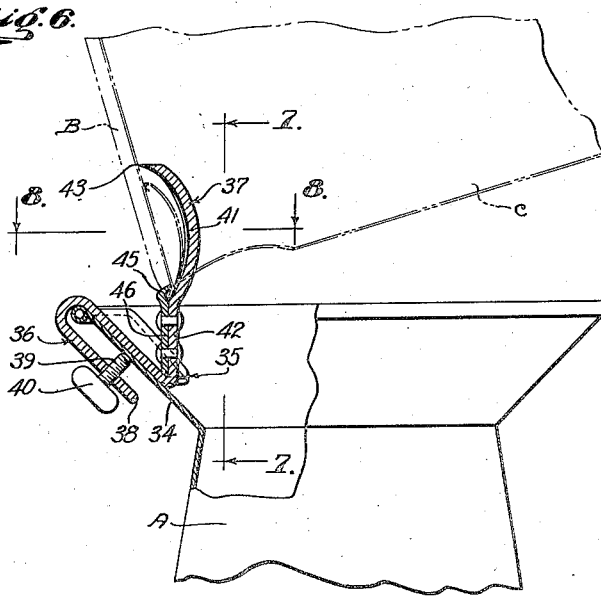
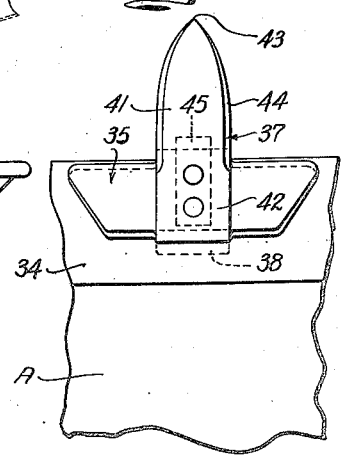
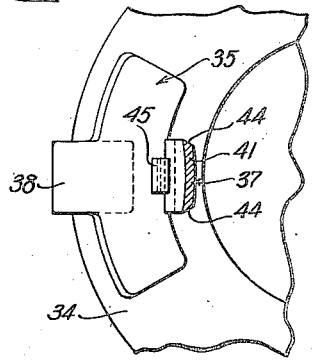
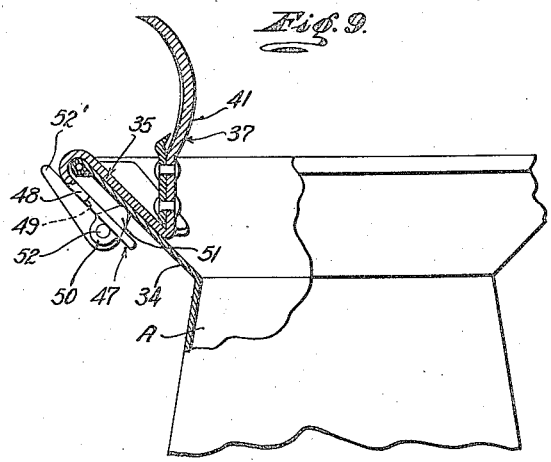
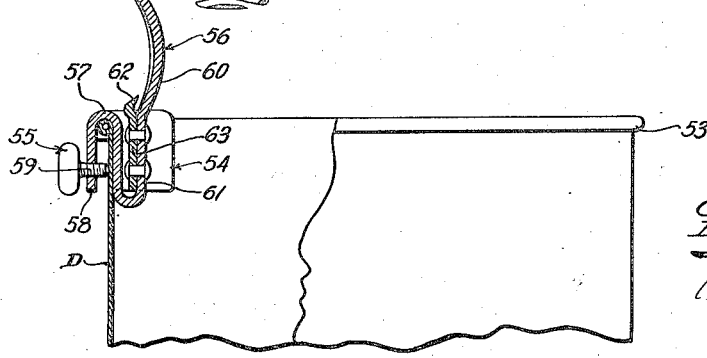
Inventor
OZRO N. WISWELL
By
His Attorney Patented Nov. 16, 1937

2,099,324

UNITED STATES PATENT OFFICE 2,099,324

DEVICE FOR OPENING CANS

Ozro N. Wiswell, Los Angeles, Calif., assignor to Swingspout Measure Company, Los Angeles, Calif., a corporation of California Application January 2, 1935, Serial No. 69

6 Claims. (Cl. 221—23)

This invention relates to a device for opening sealed containers or cans and relates more particularly to a can opening device employed in combination with a liquid handling and dispensing receptacle. A general object of this invention is to provide a practical, effective can opening device that may be easily and quickly removably attached to a dispensing device or liquid receptacle for use thereon.

Another object of the invention is to provide a can opening device to be applied to a liquid measure or dispensing receptacle that is operable to open a can to allow its contents to drain directly into the receptacle and that supports the opened can in a tilted position so that its entire contents may quickly drain into the receptacle.

Another object of the invention is to provide a can opening device of the character mentioned that may be easily and quickly detached from the dispensing device or receptacle when desired, or that may be left in operative position on the receptacle where it does not interfere with the handling of the receptacle or the pouring or draining of liquid into or from the receptacle.

Another object of the invention is to provide a can opening device of the character mentioned that is adapted for use on liquid measures and receptacles of the character employed for measuring and dispensing lubricating oils, etc. The device of the present invention is adapted for embodiment in forms for use on the various types of measures and receptacles used in measuring and dispensing motor oils, etc.

Another object of the invention is to provide a can opening device of the character mentioned that is operable to cut a large clear opening in a side wall of a can to allow its contents to drain into the dispensing device or receptacle, said opening mutilating the can to such an extent that it is unfit for refilling.

A further object of the invention is to provide a can opening device of the character mentioned that is small and compact and that is simple and inexpensive of manufacture.

The various objects and features of my invention will be fully understood from the following detailed description of typical preferred forms and applications of my invention, throughout which description reference is made to the accompanying drawings, in which:

Fig. 1 is a side elevation of a liquid measure or dispensing receptacle illustrating one form of the invention arranged in operative position thereon. Fig. 2 is an enlarged vertical fragmentary detailed sectional view of the upper portion of the receptacle illustrated in Fig. 1 with the device thereon and an opened can in position on the device. Fig. 3 is a fragmentary horizontal detailed sectional view taken substantially as indicated by line 3—3 on Fig. 2. Fig. 4 is a fragmentary elevation view of the inner side of the cutter, being a view taken as indicated by line 4—4 on Fig. 2. Fig. 5 is a fragmentary elevation view of the latch and the adjacent portion of the body being a view taken as indicated by line 5—5 on Fig. 2. Fig. 6 is a side elevation of the upper portion of another type of receptacle illustrating another form of the invention applied thereto with the device and a portion of the receptacle in vertical cross section. Fig. 7 is a fragmentary elevation view taken as indicated by line 7—7 on Fig. 6 illustrating the inner side of the device. Fig. 8 is a horizontal sectional view taken as indicated by line 8—8 on Fig. 6. Fig. 9 is a view similar to Fig. 6 illustrating another means for attaching the device to the receptacle and Fig. 10 is a side elevation of the upper portion of another form of receptacle with a portion of the receptacle and another embodiment of the invention appearing in vertical cross section.

Throughout the following detailed disclosure I will describe several forms of the invention employed on typical liquid measuring and dispensing receptacles of the character employed in handling motor oils, etc. The invention is capable of embodiment in forms for use on various classes of dispensing devices and receptacles and is not to be construed as limited or restricted to the specific forms or applications about to be described. The dispensing device or receptacle illustrated in Figs. 1 to 5, inclusive, of the drawings, includes an open topped liquid containing body 10 provided at its upper end with an inwardly projecting annular rim 11. The rim 11 is transversely curved, being upwardly convexed. A flat substantially horizontal annular flange 12 projects inwardly from the inner lower end of the rim 11. The flange 12 may be employed to indicate a level to which the receptacle is to be filled to contain or measure a definite quantity of liquid. A suitable handle 13 is provided on the body 10 of the receptacle. A swingable discharge or pouring spout 14 is provided on the body 10 to communicate with the lower portion of its interior.

The form of the invention illustrated in Figs. 1 to 5, inclusive, of the drawings, includes, generally, a base or body 15 to be arranged on the receptacle, means 16 for detachably or removably connecting the body 15 to the receptacle and means 17 on the body 15 for opening cans to drain into the receptacle.

The base or body 15 is provided to support or mount the can opening means 17 on the body 10 of the dispensing device or receptacle. In the particular form of the invention being described the body 15 is tubular or annular, it being understood that the shape of the body may be varied considerably to adapt the device for use on receptacles of various configurations. The body 15 is adapted to rest or seat on the flange 12 of the receptacle and its lower end is preferably flat and horizontal to evenly engage the upper surface of the flange 12. The body 15 may be an integral member and its inner and outer surfaces may be cylindrically curved as illustrated in the drawings. In the preferred construction the body 15 has a substantial height or vertical dimension to project a suitable distance upwardly from the flange 12. The internal diameter of the body 15 is equal to or greater than the internal diameter of the flange 12 so that the body does not obstruct the open upper end of the receptacle.

The means 16 for connecting or attaching the body 15 to the receptacle is such that the body 15 may be quickly and securely attached to the body 10 of the receptacle and easily detached therefrom when it is no longer desired to use the device on that particular receptacle. The detachable securing means 16 includes a laterally or outwardly projecting lug 18 at the lower end of the body 15. The lug 18 is spaced below the lower end of the body to engage or cooperate with the under side of the flange 12 when the body is arranged or seated on the upper side of the flange. In accordance with the invention the lug 18 is rigidly connected with the body 15. In the particular form of the invention illustrated in the drawings the lug 18 is an integral part of a member 19 arranged against the inner surface of the body 15. The member 19 may constitute an element of the can opening means 17 and is rigidly attached to the body 15 in a manner to be described hereinafter.

The means 16 for securing the body 15 to the receptacle includes a shiftable or pivoted attaching member or latch 20 on the body 15. The latch 20 is arranged on the inner side of the body 15 at a point substantially diametrically opposite the member 19. A stud or pin 21 projects inwardly from the inner side of the body 15 to shiftably or pivotally carry the latch 20. An end portion of the pin 21 may be riveted or otherwise secured in an opening in the body 15. The latch 20 has an opening 22 intermediate its ends freely passing the pin 21. A spring 23 surrounds the pin 21 and is arranged under compression between the latch 20 and a head 24 on the pin to urge the latch outwardly against the inner surface of the body 15. The latch 20 projects downwardly beyond the lower end of the body 15 and is provided at its lower end with an outwardly projecting lug or catch 25. The catch 25 is adapted to cooperate with the under side of the flange 12 and together with the lug 18 dependably retains the body 15 on the receptacle. Means is provided whereby the latch 20 may be easily shifted or pivoted to retract the catch 25 when the body 15 is being arranged on and removed from the flange 12 of the receptacle. The upper portion of the latch 20 which constitutes its handle is inclined upwardly and inwardly so that it may be moved outwardly or toward the inner surface of the body 15 to retract the catch 25. A tab or lug 26 projects outwardly from the upper end of the latch 20 over the upper end of the body 15. The lug 26 may engage the upper end of the body 15 to prevent the latch 20 from swinging about a horizontal axis.

The means 17 for opening the cans or sealed containers to be drained into the receptacle includes a cutter 27 carried by the body 15. The cutter 27 has a shank 28 which is arranged against and secured to the inner side of the body 15. In the simple form of the invention illustrated in the drawings the shank 28 of the cutter is secured to the body 15 by screws or bolts 29. As described above, the member 19 may constitute an element of the means 17 in which case the shank 28 has a channel 30 opposing the inner surface of the body 15 and receiving the member 19. The screws or bolts 29 attaching the shank 28 to the body 15 also clamp or attach the member 19 to the body.

The cutter 27 projects upwardly from its shank 28 to extend upwardly beyond the upper end of the body 15 and project upwardly from the upper end of the receptacle body 10. The cutter 27 is curved in transverse cross section being curved both vertically and horizontally. The outwardly facing surface of the cutter 27 is concave and the inner surface of the cutter is convex. The cutter 27 is preferably inclined upwardly and outwardly, its upper portion being curved upwardly and outwardly as clearly illustrated in Figs. 1 and 2 of the drawings. The opposite sides or edges 31 of the cutter 27 are curved upwardly and inwardly to converge at a point 32. The edges 31 are bevelled to sharp corners or cutting edges which join at the point 32. The point 32 is sharpened to effectively pierce a wall of the can C and may face upwardly and outwardly relative to the central vertical axis of the body 15.

The means 17 for opening cans includes a projecting part 33 to be engaged by a bead B of a can C and operable to cooperate with the bead to hold and guide the can as it is forced downwardly against the cutter 27. In the particular construction illustrated in the drawings the part 33 is an integral continuation of the member 19, it being understood that the part 33 may be a separate member or may be a tab-like part of the cutter 27. The part 33 projects upwardly beyond the upper end of the body 15 and is spaced outwardly from the cutter 27 so that the bead B of the can may be readily arranged between it and the cutter. The part 33 preferably projects upwardly and outwardly from the upper end of the body 15 and then inclines upwardly and inwardly toward the cutter 27. The active upper end portion of the part 33 has its inner and outer surfaces bevelled upwardly to its upper edge.

When it is desired to apply or attach the device to the receptacle the body 15 is arranged on the upper side of the flange 12 and the lug 18 is slipped or passed under the flange to the position illustrated in Figs. 2 and 4 of the drawings. The upper portion of the latch 20 may be pivoted outwardly or toward the inner wall of the body 15 to retract the catch 25 so that the lower end of the body may be evenly seated on the flange 12. When the latch 20 is freed the spring 23 returns the catch 25 to the position where it projects under the flange 12. The lug 18 and the catch 25 projecting under the flange 12 at substantially diametrically opposite points effectively hold the body 15 in its proper position on the flange. When it is desired to drain the contents of the can C into the receptacle body 15 the can is arranged in a position where one of its beads B is received between the part 33 and the adjacent surface of the cutter 27. In most instances it may be preferred to arrange the can C with one of its ends facing substantially downwardly and its lower bead B between the part 33 and the cutter 27. The can C is then swung downwardly and inwardly to bring its side wall against the cutter 27. As the can C is moved downwardly against the cutter 27 the point 32 pierces the side wall of the can and the sharpened longitudinal cutting edges of the cutter enlarge the opening started by the point 32. The cutter 27 is adapted to form a large unobstructed opening O in the wall of the can C. The can C is moved or swung downwardly until the point 32 of the cutter engages the inside of the adjacent end wall E of the can. This engagement of the cutter point 32 with the can wall E stops movement of the can. The cooperation of the point 32 with the end wall E and the engagement of the part 33 with the bead B supports or holds the opened can C in an inclined position such as illustrated in Fig. 2 of the drawings, so that the contents of the can may entirely drain out through the opening O. Notches 9 may be provided in the lower edge of the body 15 to allow liquid to drain from between the rim 11 and the body into the receptacle.

It will be noted that the opening O is formed in the lowermost corner portion of the tilted can C so that the contents may freely drain into the body 10 of the receptacle. The liquid from the can C is adapted to fall or pour downwardly from the opening O through the body 15 without soiling the upper end of the receptacle and without being lost. When the contents of the can have entirely drained into the receptacle the can may be easily disengaged from the cutter 27 and the part 33. After opening the can in the manner just described the can opening device may be easily removed from the receptacle or may be left in operative position on the receptacle for further use. The body 15 and the cutter 27 do not appreciably obstruct the open upper end of the receptacle body 10 so that bulk oil or other liquid may be readily poured into the receptacle when the device is arranged thereon.

The embodiment of the invention disclosed in Figs. 6, 7, and 8 of the drawings is adapted to be used on an open topped dispensing device or receptacle A having an outwardly and upwardly inclined lip 34 on its upper end. The can opening device illustrated in Figs. 6, 7 and 8 of the drawings includes a base or body 35, means 36 for removably attaching the body 35 to the receptacle A and can opening means 37 on the body 35.

The base or body 35 may be a simple plate-like member adapted to rest or seat on the upper or inner surface of the lip 34. The body 35 is suitably shaped or curved to evenly bear on the lip 34. The upper and lower edges of the body 35 may be curved to be substantially concentric with and suitably spaced from the upper and lower edges of the lip 34. The means 36 for removably attaching the body 35 to the receptacle A includes a lug or hook 38 on the body. The hook 38 extends from the upper edge of the body 35 and is curved upwardly and outwardly and then downwardly and inwardly to have its major portion substantially parallel with the body 35. In practice the hook 38 may be integral with the body 35. When the body 35 is arranged on the lip 34 of the receptacle A the hook 38 is adapted to engage over the upper edge of the lip 34 to hold the body on the lip.

While the hook 38 may comprise the means 36 for attaching the body 35 to the receptacle it is preferred to include a more positive gripping or holding element on the hook to dependably secure the body to the receptacle so that the receptacle may be moved and handled without danger of displacing the can opening device or the can thereon. In the form of the invention being described the removable attaching means 36 includes a set screw or thumb screw 39 threaded through an opening in the hook 38 and adapted to clamp against the external surface of the lip 34. A wing or handle 40 is provided on the screw 39 to facilitate its easy operation. It will be apparent how the screw 39 may be threaded inwardly to securely hold the body 35 in position on the lip 34.

The means 37 for opening sealed containers or cans includes a cutter 41 carried by the body 35. The cutter 41 includes a shank 42 projecting upwardly from the lower end or edge of the body 35. The shank 42 and the cutter 41 may be integral with the body 35. The active portion of the cutter 41 projects upwardly and outwardly from the shank 42 to extend upwardly beyond the upper end of the lip 34. The cutter 41 is similar to the cutter 27 previously described being transversely and longitudinally curved. The cutter 41 has its concave side facing outwardly and its convex side facing inwardly and is provided at its upper end with a sharpened point 43 for piercing a wall of the can. The cutter 41 may be slightly inclined upwardly and outwardly relative to the central vertical axis of the receptacle A. The opposite side edges 44 of the cutter 41 converge upwardly and outwardly to the point 43 and are suitably sharpened or bevelled. The point 43 faces outwardly and may face outwardly and slightly upwardly.

The opening means 37 includes a part 45 to be engaged by a bead B of the can C to hold or guide the can as it is forced downwardly against the cutter 41. In the particular structure illustrated in the drawings the part 45 is a projecting upper portion of a member 46 attached to the outer side of the cutter shank 42. The member 46 may be riveted to the shank 42. The part 45 is inclined upwardly and outwardly and then upwardly and inwardly toward the adjacent surface of the cutter 41. The upper portion of the part 45 is bevelled to an edge. The part 45 is spaced from the adjacent face or surface of the cutter 41 leaving a space adapted to receive the bead B of the can C.

The device illustrated in Figs. 6, 7 and 8 of the drawings may be easily applied to the receptacle by arranging the body 35 in position on the lip 34 and then tightening the screw 39 against the lip to clamp the body in place. The can C to be opened is positioned so that one of its beads B is received between the part 45 and the adjacent surface of the cutter 41 and the can is then moved or swung downwardly and inwardly against the cutter. The cutter 41 forms a large opening in the wall of the can C which allows the liquid from the can to freely drain downwardly into the receptacle A. The point 43 of the cutter is adapted to engage a wall of the can C to limit the movement of the can and, together with the part 45, is adapted to support the opened can in a tilted position such as indicated by the broken lines in Fig. 6. The opening formed by the cutter 41 is in the lower corner of the opened can C and allows the contents to quickly and fully drain into the receptacle A. When the contents are fully drained from the can C the can may be easily disengaged from the cutter 41 and part 45. The device disclosed in Figs. 6, 7 and 8 of the drawings is small and compact and does not interfere with the pouring of liquid into the receptacle A or the handling of the receptacle when left in operative position on the lip 34.

Fig. 9 of the drawings illustrates a form of the invention in which the body 35 and the can opening means 37 may be identical with those of the device illustrated in Figs. 6, 7 and 8. In the modification disclosed in Fig. 9 the means 47 for removably securing the body 35 to the receptacle lip 34 includes a hook 48 similar to or identical with the hook 38. A slot or elongate opening 49 is provided in the hook 48 and suitable bosses or lugs 50 are provided on the outer side of the hook adjacent the opening. A cam 51 extends through the opening 49 and is pivotally supported by a pin 52 carried by the lugs 50. The cam 51 has a rounded inner end adapted to cooperate with the external surface of the lip 34 to tightly clamp the body 35 on the lip. A suitable handle 52' is provided on the cam 51 so that it may be pivoted between the position where its active end is clear of the lip 34 and a position where its active end cams against the lip to secure the body thereto.

Fig. 10 of the drawings illustrates a form of the invention for use on a dispensing device or receptacle D having a plain vertical upper end portion devoid of a rim. The particular receptacle D illustrated has a comparatively small outwardly turned bead 53 on its upper end. The form of the invention illustrated in Fig. 10 of the drawings includes a body 54 adapted to seat against the inner surface of the receptacle D, means 55 for detachably securing the body 54 to the receptacle and can opening means 56 carried by the body 54.

The body 54 is shaped to fit against the internal surface of the receptacle D, for example, where the receptacle is cylindrical the body 54 is suitably curved to seat against the curved wall of the receptacle. An upwardly and outwardly curved rim 57 extends along the upper end of the body 54 and is adapted to hook or engage on the bead 53 of the receptacle to support the body. The means 55 for securing the body 54 to the receptacle D includes a lug or hook 58 projecting downwardly from the rim 57 and a screw 59 threaded through an opening in the hook 58 to clamp against the wall of the receptacle D. It is to be understood that a cam of the character illustrated in Fig. 9 of the drawings may be substituted for the screw 59 if desired. The screw 59 has a suitable wing or handle whereby it may be easily operated. The screw 59 is adapted to securely hold the body 54 in position on the receptacle D.

The can opening means 56 may be identical with the means 37 of the form of the invention disclosed in Figs. 6, 7 and 8 of the drawings. The means 56 includes a cutter 60 having a shank 61 projecting from the body. The shank 61 may be integral with the body 54 and may project upwardly from its lower end portion. The active portion of the cutter 60 may be identical with the corresponding portion of the cutter 41 previously described. The means 56 includes a part 62 for engaging the bead of a can. The part 62 may be the upper projecting portion of a member 63 on the shank 61 and may be identical with the part 45. It is believed that the operation of the device illustrated in Fig. 10 of the drawings will be readily understood.

Having described only typical forms and applications of my invention, I do not wish to be limited or restricted to the specific forms and applications herein set forth, but wish to reserve to myself any modifications or variations that may appear to those skilled in the art or fall within the scope of the following claim.

Having described my invention, I claim:

1. In combination, an open topped receptacle having an inwardly projecting flange at its upper end, and a device for opening cans including a body to be arranged on the flange, a projecting cutter carried by the body, and means for attaching the body to the receptacle including a latch on the body for engaging under the flange.

2. A device for use on an open topped receptacle having an inwardly projecting flange at its upper end, said device including a body adapted to be arranged on the flange, a cutter carried by the body to project therefrom, and means for attaching the body to the receptacle including a shiftable attaching member on the body adapted to engage under the flange.

3. A device for use on an open topped receptacle having an inwardly projecting flange at its upper end, said device including a body adapted to be arranged on the flange, a cutter carried by the body to project therefrom, and means for attaching the body to the receptacle including a lug on the body for engaging under the flange, and a shiftable attaching member on the body spaced from the lug and adapted to engage under the flange.

4. A device for use on an open topped receptacle having an inwardly projecting flange at its upper end, said device including a body adapted to be arranged on the flange, a cutter carried by the body to project therefrom, and means for attaching the body to the receptacle including a spring pressed latch on the body for cooperating with the flange.

5. A device for use on an open topped receptacle having an inwardly projecting flange at its upper end, said device including a body adapted to be arranged on the flange, a cutter carried by the body to project therefrom, and means for attaching the body to the receptacle including two parts on the body for projecting outwardly under the flange at circumferentially spaced points, one of said parts being retractable.

6. A device for use on an open topped receptacle having an inwardly projecting flange at its upper end, said device including a body adapted to be arranged on the flange, means on the body for opening a can to drain into the receptacle, said means including a cutter projecting upwardly from the body, and a projecting part on the body for cooperating with a bead of a can to direct a wall of the can against the cutter when the can is forced against the cutter, and means for attaching the body to the receptacle including a latch on the body for cooperating with the flange.

OZRO N. WISWELL.